G. W. BILLINGS.
BARBED FENCE-WIRE.
No. 184,694.  Patented Nov. 28, 1876.
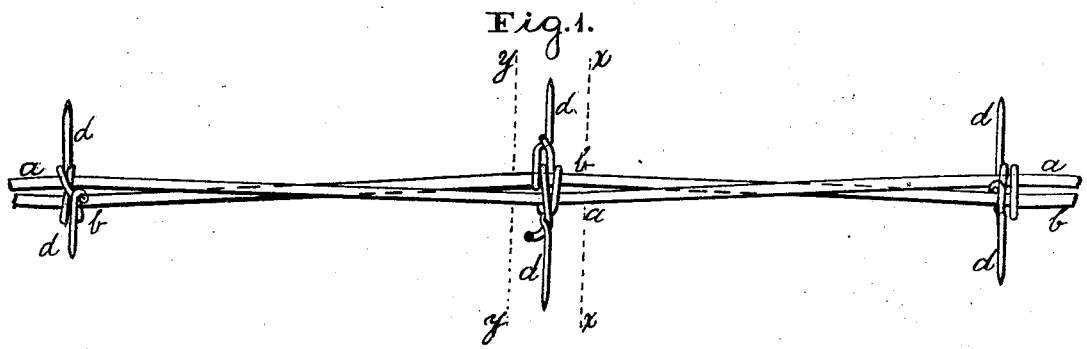
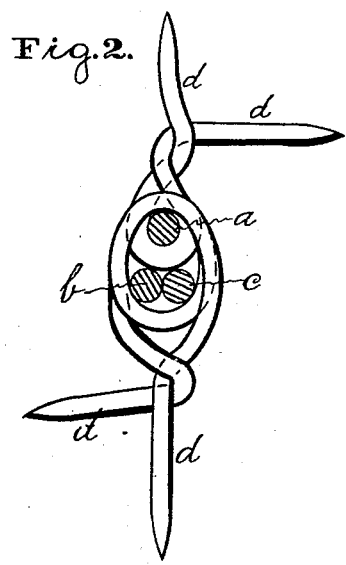
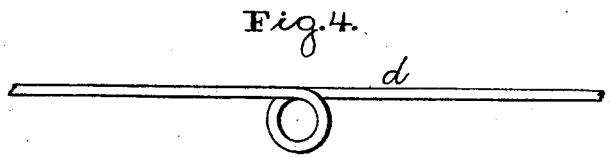
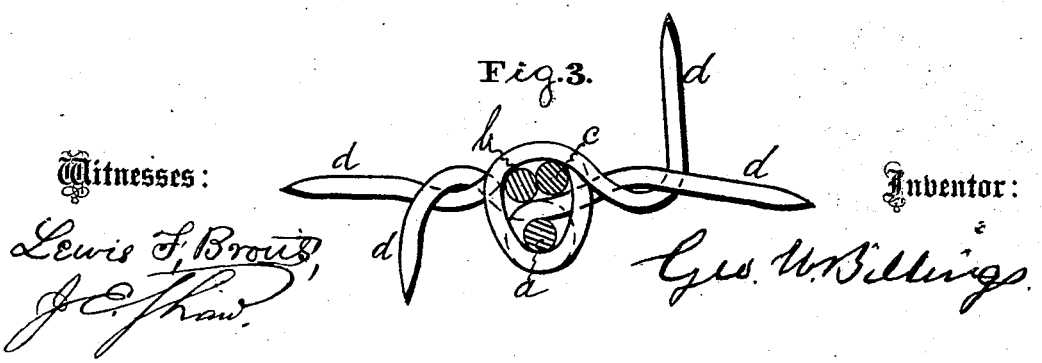
Witnesses:
Lewis F. Brown
J. E. Shaw
Inventor:
Geo. W. Billings

UNITED STATES PATENT OFFICE.

GEORGE W. BILLINGS, OF CHICAGO, ILLINOIS.

IMPROVEMENT IN BARBED FENCE-WIRE.

Specification forming part of Letters Patent No. 184,694, dated November 28, 1876; application filed June 21, 1876.

*To all whom it may concern:*

Be it known that I, GEORGE W. BILLINGS, of Chicago, Cook county, Illinois, have invented an Improvement in Barbed Fence Wires or Cables, of which the following is a specification:

My invention relates to barbed fence-wire; and consists of three or more steel or iron wires braided or plaited together, and then fastened together with sharp-pointed barbs of steel wire, in such a manner that the barbs shall be entirely free from liability to be moved lengthwise on the cable.

In the drawings, Figure 1 is an elevation of a section of cable composed of three wires braided together, and furnished with my peculiarly-formed barbs. Fig. 2 is a sectional elevation of the same, on the line $x\,x$ of Fig. 1. Fig. 3 is a similar view on the line $y\,y$ of Fig. 1. Fig. 4 represents a side view of the barb-wire, showing the loop or eyelet formed in it previous to its application to the cable; and Fig. 5, an edge view of the same, showing the loop in its open condition.

$a$, $b$, and $c$ are the three wires composing the cable. These wires are braided or plaited by alternately raising each of them above the other two, and securing them in these positions by the application thereto, at each alternation, of a barb, as shown in the drawings. The barbs are composed of two separate wires, $d$, Figs. 4 and 5, in their application to the cable the loop in one of them being caused to bestride two wires of the cable, and the loop in the other barb-wire being caused to bestride the third wire of the cable. A quarter-turn is then given to two opposing legs of the barb-wires, and the loops are closed, when the projecting ends of these wires stand at right angles to the cable. A suitable instrument is then applied to two of these ends, or, if desired, to each pair of the four ends at one operation, and they are twisted together, so that the projecting ends stand at right angles with the cable, as represented in Figs. 2 and 3, thus forming a lock or clutch, which renders the barbs firm and immovable on the cable.

Barb-wires may be applied, as described, to cables composed of three or more separate wires without the braiding; but I prefer to braid the wires of the cable.

I claim—

Three or more braided wires forming a cable, in combination with a barb formed of two wires, and interlocked thereon, substantially as shown and described.

GEO. W. BILLINGS.

Witnesses:
THOS. A. BURTT,
JNO. A. BELL.